US011656599B2

(12) United States Patent
Hada

(10) Patent No.: US 11,656,599 B2
(45) Date of Patent: May 23, 2023

(54) MACHINING SIMULATOR AND STORAGE MEDIUM ENCODED WITH MACHINING SIMULATION PROGRAM

(71) Applicant: FANUC CORPORATION, Yamanashi (JP)

(72) Inventor: Hiroaki Hada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 417 days.

(21) Appl. No.: 16/811,403

(22) Filed: Mar. 6, 2020

(65) Prior Publication Data
US 2020/0293022 A1 Sep. 17, 2020

(30) Foreign Application Priority Data
Mar. 14, 2019 (JP) .............................. JP2019-047159

(51) Int. Cl.
*G05B 19/4069* (2006.01)
*G06F 30/23* (2020.01)
(Continued)

(52) U.S. Cl.
CPC ..... *G05B 19/4069* (2013.01); *G05B 19/4097* (2013.01); *G06F 30/17* (2020.01); *G06F 30/23* (2020.01)

(58) Field of Classification Search
CPC ............ G05B 19/4069; G05B 19/4097; G05B 19/19; G05B 2219/35349; G06F 30/17; G06F 30/23; G06F 2119/18; Y02P 90/02
(Continued)

(56) References Cited

U.S. PATENT DOCUMENTS 5,416,715 A * 5/1995 Kinoshita .......... G05B 19/4069
700/184
8,645,086 B1 * 2/2014 Castle ..................... G06F 30/23
702/42
(Continued)

FOREIGN PATENT DOCUMENTS

JP 3-1201 1/1991
JP 7-311612 11/1995
(Continued)

OTHER PUBLICATIONS

Japanese Office Action dated Aug. 31, 2021 in corresponding Japanese Patent Application No. 2019-047159.

*Primary Examiner* — Juan C Ochoa
(74) *Attorney, Agent, or Firm* — Wenderoth, Lind & Ponack, L.L.P.

(57) ABSTRACT

A machining simulator that virtually executes a CNC program to simulate a machining result, includes: a 3D model generating unit that virtually executes a plurality of CNC programs to generate a 3D model from respective machining results obtained; a reference position specifying unit that specifies a predetermined coordinate common to a generated plurality of 3D models as a reference position; a superimposed model generating unit that generates a superimposed model in which a plurality of 3D models is superimposed at the reference position; a finite difference model generating unit that generates a finite difference model obtained by taking a finite difference of the 3D models included in the superimposed model generated; and a display control unit that controls display of at least one of the superimposed model generated and the finite difference model.

5 Claims, 5 Drawing Sheets

(51) Int. Cl.
     *G05B 19/4097*     (2006.01)
     *G06F 30/17*       (2020.01)

(58) Field of Classification Search
     USPC .............................................................. 703/1
     See application file for complete search history.

(56) References Cited

U.S. PATENT DOCUMENTS

| | | | |
|---|---|---|---|
| 8,655,476 B2 * | 2/2014 | Wang | B22D 46/00 |
| | | | 703/2 |
| 10,528,040 B2 * | 1/2020 | Noguchi | G05B 19/4155 |
| 10,540,816 B2 * | 1/2020 | Kuribara | G06T 19/006 |
| 10,921,789 B2 * | 2/2021 | Kadokura | G05B 19/41875 |
| 11,300,932 B2 * | 4/2022 | Oda | G05B 19/41845 |
| 2003/0045965 A1 * | 3/2003 | Sinn | G05B 19/4097 |
| | | | 700/182 |
| 2003/0052882 A1 | 3/2003 | Sinn | |
| 2014/0172144 A1 | 6/2014 | Kniazev | |
| 2018/0211442 A1 * | 7/2018 | Kuribara | G06T 19/006 |

FOREIGN PATENT DOCUMENTS

| | | | | |
|---|---|---|---|---|
| JP | 10-207523 | 8/1998 | | |
| JP | 2001-125613 | 5/2001 | | |
| JP | 2004-42752 | 2/2004 | | |
| JP | 2010-244406 | 10/2010 | | |
| JP | 2010-272027 | 12/2010 | | |
| JP | 2016-18539 | 2/2016 | | |
| JP | 2018-120264 | 8/2018 | | |
| WO | 2010011590 | * | 1/2010 | .............. A61F 2/30 |
| WO | 2014/097371 | 6/2014 | | |

* cited by examiner

US 11,656,599 B2

MACHINING SIMULATOR AND STORAGE MEDIUM ENCODED WITH MACHINING SIMULATION PROGRAM

This application is based on and claims the benefit of priority from Japanese Patent Application No. 2019-047159, filed on 14 Mar. 2019, the content of which is incorporated herein by reference.

BACKGROUND OF THE INVENTION

Field of the Invention

The present invention relates to a machining simulator and a storage medium encoded with a machining simulation program.

Related Art

Conventionally, it is known to use CNC (computerized numerical control) programs to perform machining in industrial machines including an industrial robot and a machine tool. With the industrial machines, it is possible to confirm the difference in CNC programs by displaying multiple CNC programs.

However, the CNC programs are composed of numerical values and character strings. Therefore, it is not possible to visually know machining results of what kind of difference would appear when the machining is actually carried out. Furthermore, the CNC programs describe a very large number of settings. Therefore, machining is sometimes performed even when a part of the program has been changed and the change has been not noticed. To address this, a numerical control simulator capable of visually knowing the machining results by simulating the machining process has been proposed (for example, refer to Japanese Unexamined Patent Application, Publication Nos. 2001-125613 and 2016-18539).

Patent Document 1: Japanese Unexamined Patent Application, Publication No. 2001-125613
Patent Document 2: Japanese Unexamined Patent Application, Publication No. 2016-18539

SUMMARY OF THE INVENTION

Incidentally, in Japanese Unexamined Patent Application, Publication Nos. 2001-125613 and 2016-18539, results simulated by two CNC programs are superimposed. Thus, in Japanese Unexamined Patent Application, Publication Nos. 2001-125613 and 2016-18539, it is possible to visually know the difference in the machining results. However, in Japanese Unexamined Patent Application, Publication Nos. 2001-125613 and 2016-18539, the superimposition is performed with a specific machining point as a reference, and thus is limited to the difference of the specific machining point. In this regard, it is preferable to visually know the overall finite difference of the machining result.

An aspect of the present disclosure relates to a machining simulator that virtually executes a CNC program to simulate a machining result, the machining simulator including: a 3D model generating unit that virtually executes a plurality of CNC programs to generate a 3D model from respective machining results obtained; a reference position specifying unit that specifies a predetermined coordinate common to a generated plurality of 3D models as a reference position; a superimposed model generating unit that generates a superimposed model in which a plurality of 3D models is superimposed at the reference position; a finite difference model generating unit that generates a finite difference model obtained by taking a finite difference of the 3D models included in the superimposed model generated; and a display control unit that controls display of at least one of the superimposed model generated and the finite difference model.

Another aspect of the present disclosure relates to a non-transitory computer-readable storage medium encoded with a machining simulation program that causes a computer to function as a machining simulator that virtually executes a CNC program to simulate a machining result, the machining simulation program causing the computer to function as: a 3D model generating unit that virtually executes a plurality of CNC programs to generate a 3D model from respective machining results obtained; a reference position specifying unit that specifies a predetermined coordinate common to a plurality of 3D models generated as a reference position; a superimposed model generating unit that generates a superimposed model in which a plurality of 3D models is superimposed at the reference position; a finite difference model generating unit that generates a finite difference model obtained by taking a finite difference of the 3D models included in the superimposed model generated; and a display control unit that controls display of at least one of the superimposed model generated and the finite difference model.

According to one aspect, a machining simulator capable of visually outputting the overall finite difference of a machining result and a storage medium encoded with a machining simulation program can be provided.

DETAILED DESCRIPTION OF THE INVENTION

Hereinafter, with reference to FIGS. 1 to 5, a description will be given of a machining simulator 1 and a storage medium encoded with a machining simulation program according to an embodiment of the present disclosure. First, a description will be given of a CNC program of which machining results are simulated by the machining simulator 1 and the machining simulation program of the present embodiment.

The CNC program is, for example, a program that defines the operation of an industrial machine such as an industrial robot and a machining device. The CNC program has a plurality of machining programs which systematically show the operation of the industrial machine. By a plurality of machining programs being executed in order, the industrial machine executes the machining. In a case in which there is a difference in the machining programs, the machining results obtained by the machining are generally different. The machining simulator 1 according to the present embodiment virtually executes the CNC program and simulates the machining result. Furthermore, the machining simulation program according to the present embodiment causes a computer to operate as the machining simulator 1.

Figure 1:
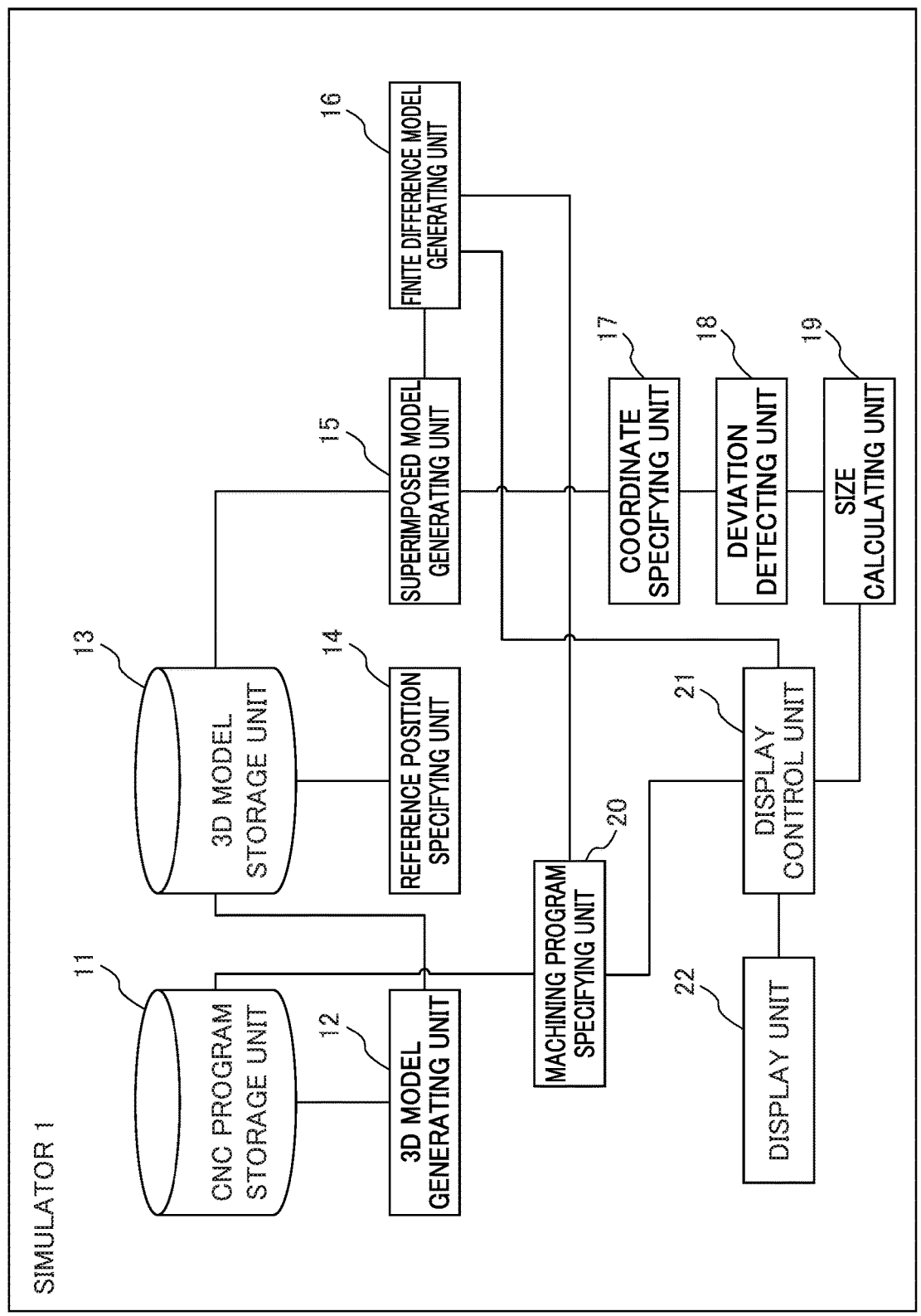
FIG. 1 is a block diagram showing an overall configuration of a machining simulator according to an embodiment.

The machining simulator 1 is provided, for example, as a portion of an industrial machine. As shown in FIG. 1, the machining simulator 1 includes a CNC program storage unit 11, a 3D model generating unit 12, a 3D model storage unit 13, a reference position specifying unit 14, a superimposed model generating unit 15, a finite difference model generating unit 16, a coordinate specifying unit 17, a deviation detecting unit 18, a size calculating unit 19, a machining program specifying unit 20, a display control unit 21, and a display unit 22.

The CNC program storage unit 11 is, for example, a secondary storage medium such as a hard disk. The CNC program storage unit 11 stores a plurality of the CNC programs. The CNC program storage unit 11 stores, for example, similar CNC programs or a plurality of CNC programs of different versions.

The 3D model generating unit 12, for example, is realized by the operation of a CPU. The 3D model generating unit 12 virtually executes the plurality of CNC programs to generate the respective 3D models from the resulting machining results. The 3D model generating unit 12 generates a 3D model of the resulting workpiece, for example, in a case in which the industrial machine is operated by executing the plurality of CNC programs. Furthermore, the 3D model generating unit 12 generates, for example, a 3D model for each version of the CNC program.

The 3D model storage unit 13 is, for example, a secondary storage medium such as a hard disk. The 3D model storage unit 13 stores the 3D model generated by the 3D model generating unit 12.

The reference position specifying unit 14 is, for example, realized by the operation of the CPU. The reference position specifying unit 14 specifies a predetermined coordinate common to the generated plurality of 3D models as a reference position. The reference position specifying unit 14, for example, specifies a coordinate of a vertex common to the plurality of 3D models as a reference position. More specifically, in the plurality of 3D models, the reference position specifying unit 14 specifies the vertex of the same figure and of the same coordinates as the reference position. It should be noted that the "vertex" in the present embodiment is the coordinate of a polygon representing a figure included in the 3D model.

Figure 2:
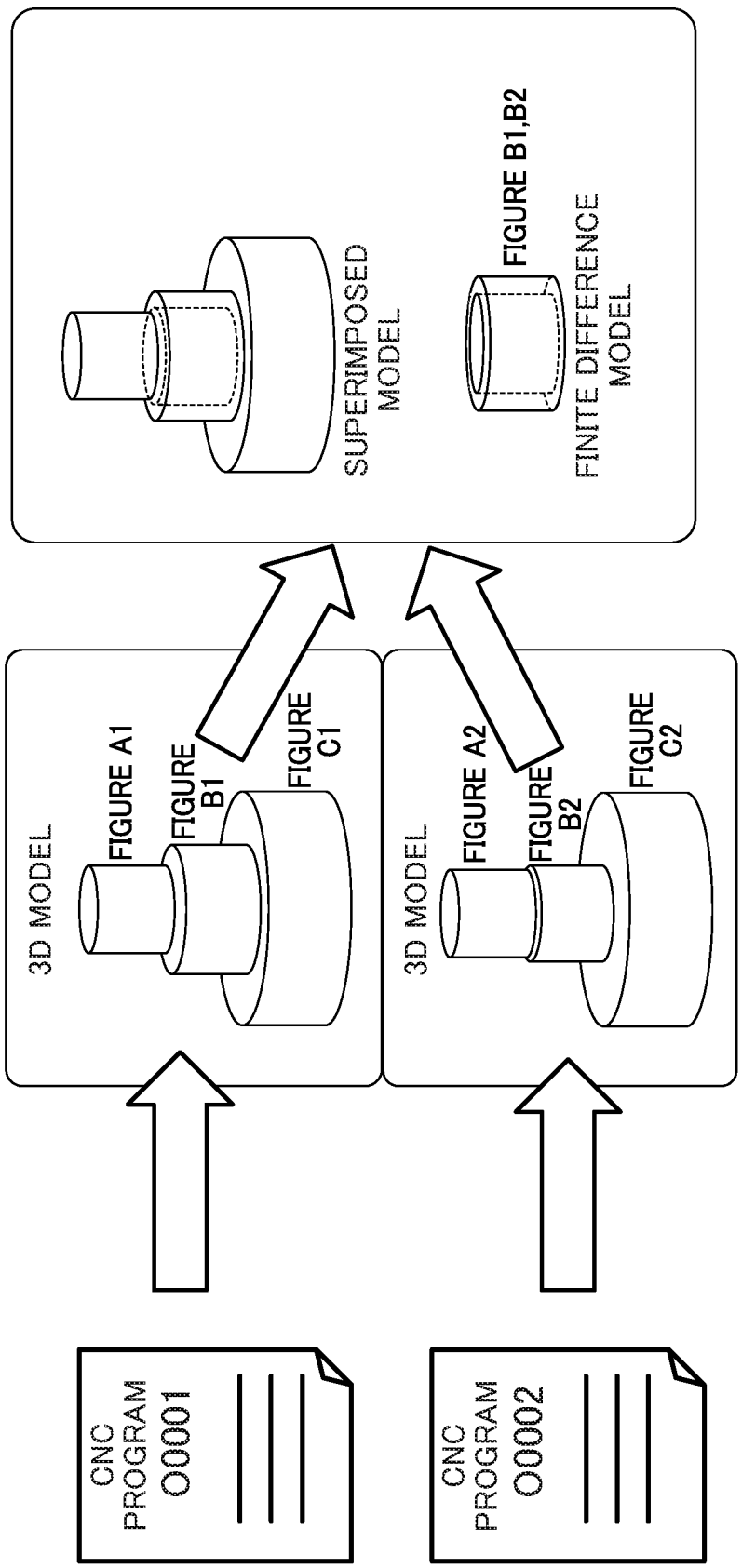
FIG. 2 is a conceptual diagram showing a machining result simulated by a machining simulator of one embodiment.
Figure 3:
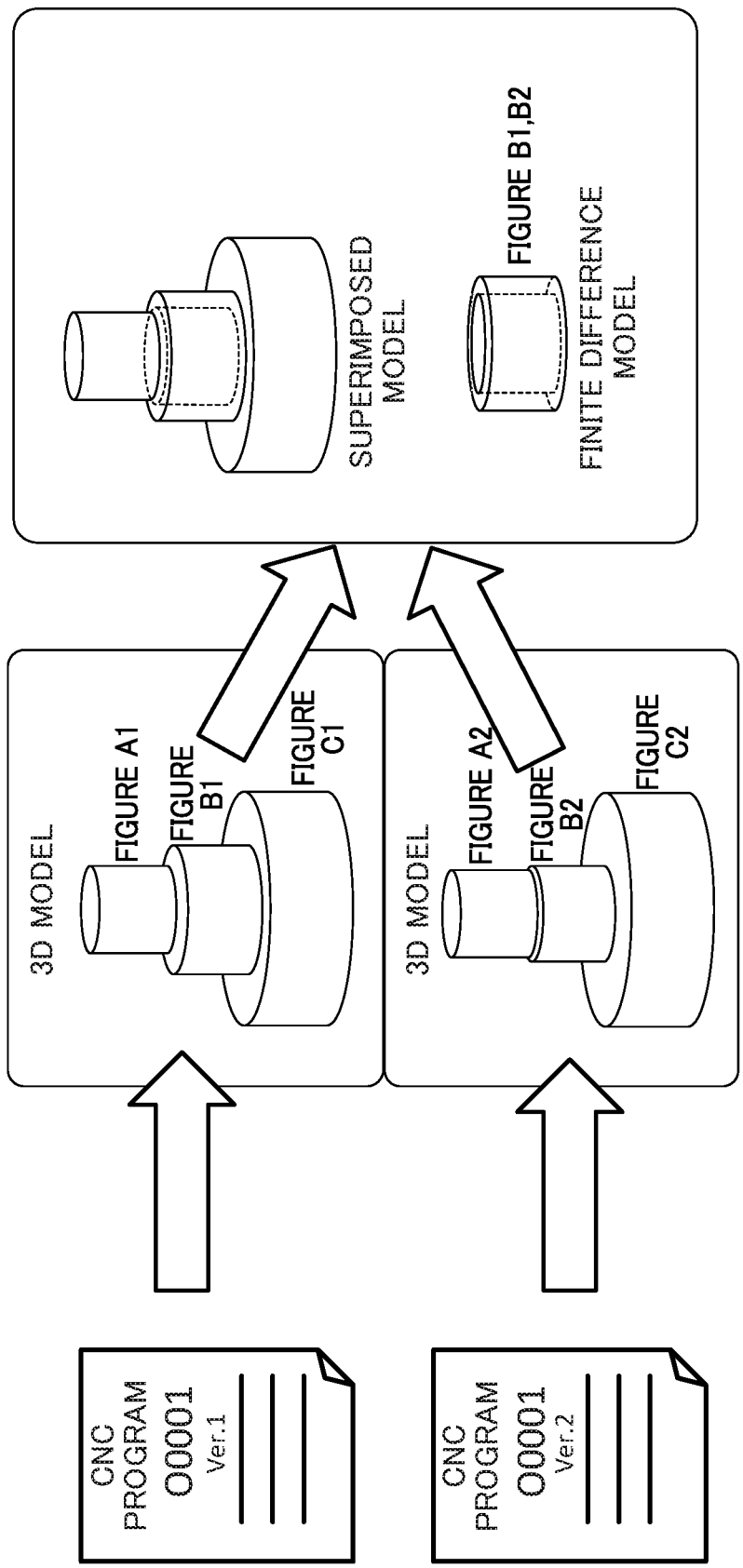
FIG. 3 is a conceptual diagram showing another machining result simulated by a machining simulator of one embodiment.

The superimposed model generating unit 15 is, for example, realized by the operation of the CPU. The superimposed model generating unit 15 generates a superimposed model in which a plurality of 3D models is superimposed at a reference position. For example, as shown in FIG. 2, the superimposed model generating unit 15 generates a superimposed model of similar CNC programs. Furthermore, for example, as shown in FIG. 3, the superimposed model generating unit 15 generates a superimposed model of CNC programs of different version.

The finite difference model generating unit 16 is, for example, realized by the operation of the CPU. The finite difference model generating unit 16 generates, among the generated superimposed models, a finite difference model obtained by taking the finite difference in the 3D figures. The finite difference model generating unit 16 generates a finite difference model using a Boolean operation, a ray tracing method or the like. The finite difference model generating unit 16, for example, generates a finite difference model showing only the finite difference as shown in FIG. 2 or 3.

The coordinate specifying unit 17 is, for example, realized by the operation of the CPU. The coordinate specifying unit 17 specifies the vertex coordinate of the vertex in a corresponding relationship in each of the superimposed 3D models. For example, the coordinate specifying unit 17 specifies the vertex coordinates of figure A1, figure B1, and figure C1 in FIG. 2 or 3. Furthermore, for example, the coordinate specifying unit 17 specifies the vertex coordinates of figure A2, figure B2, and figure C2 in FIG. 2 or 3. In this embodiment, the coordinate specifying unit 17 specifies the same vertex coordinates for figures A1 and A2. Furthermore, the coordinate specifying unit 17 specifies the same vertex coordinates for figure C1 and figure C2. On the other hand, the coordinate specifying unit 17 specifies different vertex coordinates for figure B1 and figure B2.

The deviation detecting unit 18 is, for example, realized by the operation of the CPU. The deviation detecting unit 18 detects deviations between the 3D models of the vertex coordinates of the specified vertices. The deviation detecting unit 18 detects, for example, the presence or absence of a difference in the vertex coordinates of the corresponding figures between the 3D models.

The size calculating unit 19 is, for example, realized by the operation of the CPU. The size calculating unit 19 calculates the size of a detected deviation. The size calculating unit 19, for example, calculates the distance between the corresponding vertex coordinates to thereby calculate the size of the deviation.

Figure 4:
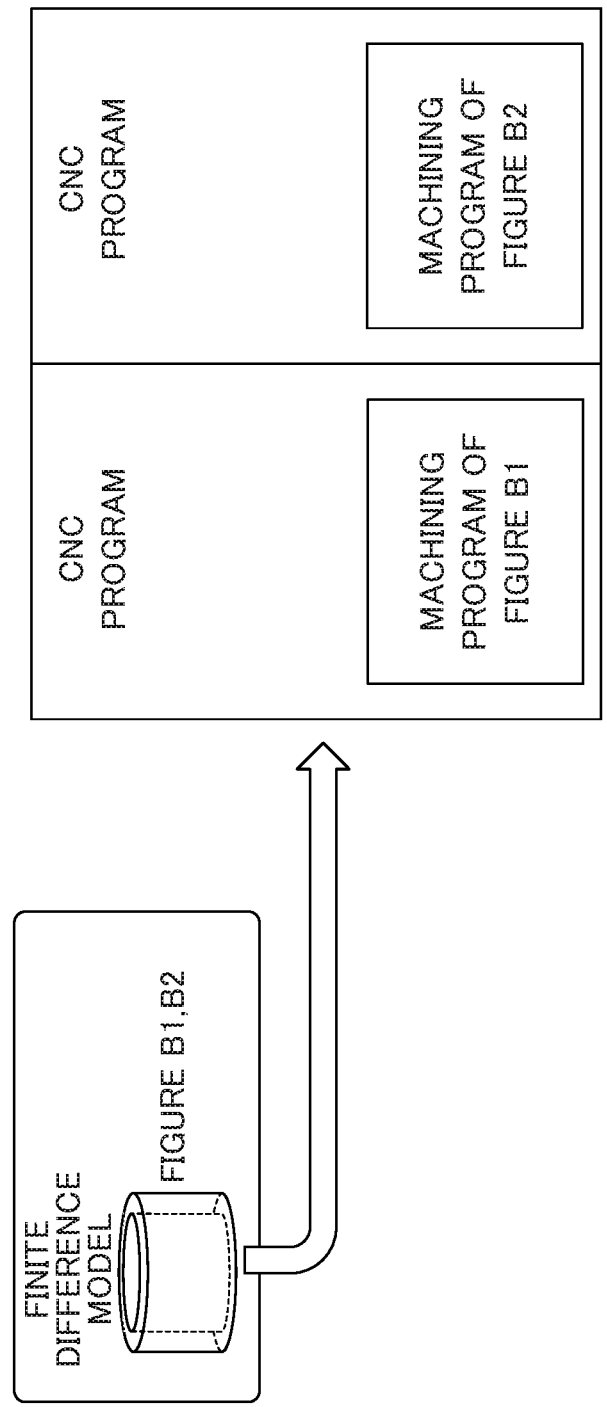
FIG. 4 is a conceptual diagram showing a display result of a machining program corresponding to a finite difference model in a machining simulator of one embodiment.

The machining program specifying unit 20 is, for example, realized by the operation of the CPU. As shown in FIG. 4, the machining program specifying unit 20 specifies a machining program corresponding to the generated finite difference model among a plurality of machining programs included in each CNC program. For example, the machining program specifying unit 20 specifies at least two machining programs corresponding to the finite difference model, which are selected by using an input unit such as a mouse (not shown).

The display control unit 21 is, for example, realized by the operation of the CPU. The display control unit 21 controls the display of at least one of the generated superimposed model and the finite difference model. Furthermore, the display control unit 21 controls the display of the size of the calculated deviation. Furthermore, the display control unit 21 controls the display of the specified machining program.

The display unit 22 is, for example, display device such as a monitor. The display unit 22 displays the 3D model, the superimposed model, the finite difference model, and the size of the deviation.

Figure 5:
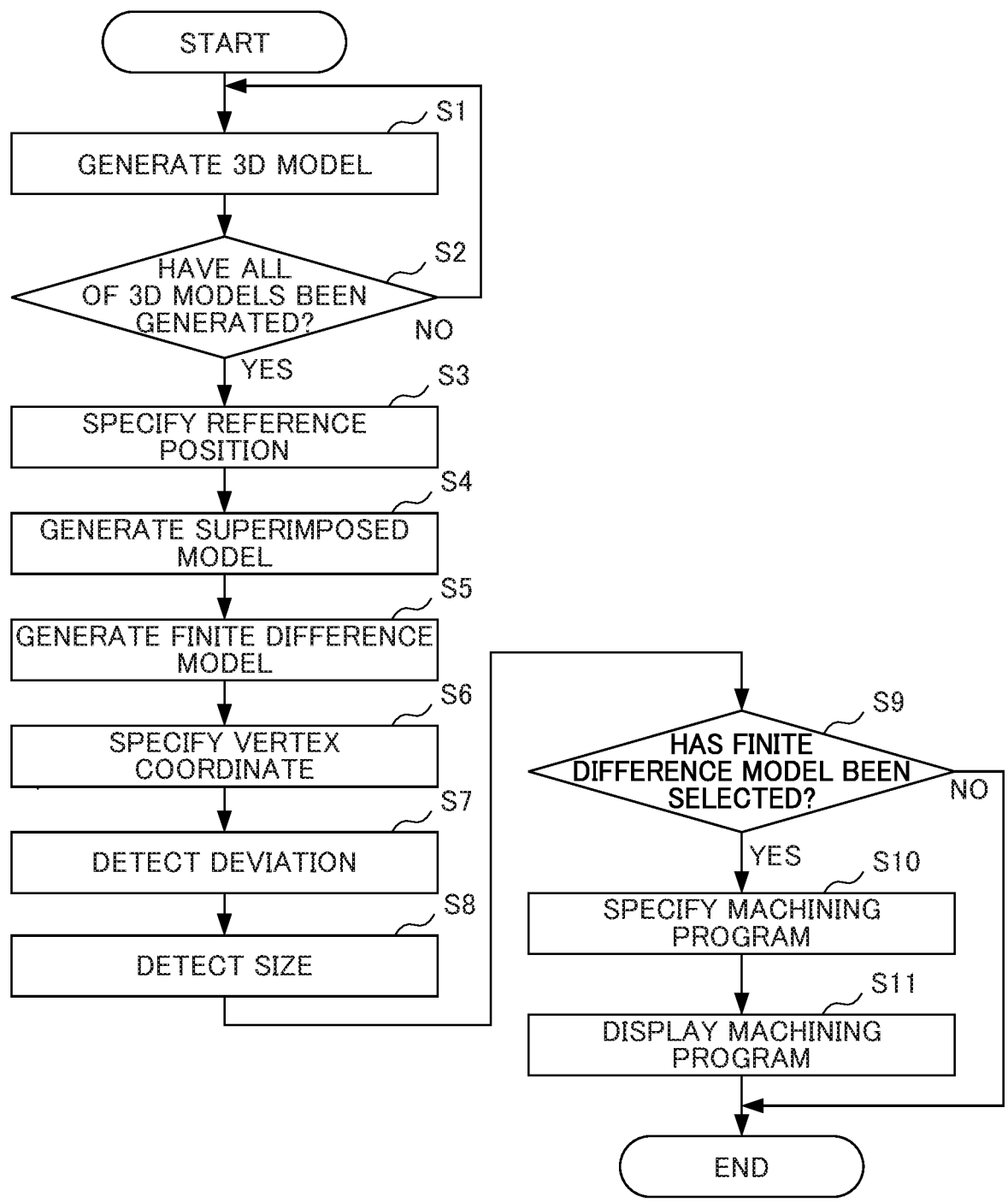
FIG. 5 is a flowchart showing a flow of processing of a machining simulator of one embodiment.

Next, a description will be given of the operation of the machining simulator 1 according to the present embodiment with reference to the flowchart of FIG. 5. First, the 3D model generating unit 12 reads a CNC program stored in the CNC program storage unit 11. The 3D model generating unit 12 virtually executes the read CNC program to generate a 3D model (Step S1). Thereafter, whether or not all of the 3D models to be compared are generated is determined (Step S2). In a case in which all of the 3D models have been generated (YES), the processing advances to Step S3. On the other hand, in a case in which 3D models to be generated still remain (NO), the processing returns to Step S1.

In Step S3, the reference position specifying unit 14 specifies a predetermined coordinate common to the plurality of 3D models as a reference position. Thereafter, the superimposed model generating unit 15 generates a superimposed model in which the reference positions of the 3D models are superimposed on each other (Step S4). Thereafter, the finite difference model generating unit 16 generates a finite difference model obtained by taking the finite difference in the 3D figures (Step S5). Thereafter, the coordinate specifying unit 17 specifies the coordinates of the vertices in the corresponding relationship (Step S6). Thereafter, the deviation detecting unit 18 detects the deviation of the specified coordinates (Step S7). Thereafter, the size calculating unit 19 calculates the size of the deviation (Step S8).

Thereafter, in Step S9, it is determined whether the finite difference model is selected. In a case in which the finite difference model has been selected (YES), the processing advances to Step S10. On the other hand, in a case in which a finite difference model has not been selected (NO), the present flow of processing ends.

In Step S10, the machining program specifying unit 20 specifies a machining program corresponding to the selected finite difference model. Thereafter, the display control unit 21 displays the specified machining program on the display unit 22 (Step S11). Thus, the present flow of processing ends.

According to the machining simulator 1 and the machining simulation program according to the present embodiment described above, the following effects are achieved.

(1) The machining simulator 1 that virtually executes a CNC program to simulate a machining result, includes: a 3D model generating unit 12 that virtually executes a plurality of CNC programs to generate a 3D models from respective machining results obtained; a reference position specifying unit 14 that specifies a predetermined coordinate common to a generated plurality of 3D models as a reference position; a superimposed model generating unit 15 that generates a superimposed model in which a plurality of 3D models is superimposed at the reference position; a finite difference model generating unit 16 that generates a finite difference model obtained by taking a finite difference of the 3D models among the superimposed model generated; and a display control unit 21 that controls display of at least one of the superimposed model generated and the finite difference model. With such a configuration, it is possible to visually output the overall finite difference of the machining result by at least two CNC programs. Therefore, it is possible to inform intuitively the effect reflected in machining result by the difference in the CNC programs.

(2) The reference position specifying unit 14 specifies a plurality of coordinates common to a plurality of 3D models as the reference position. With such a configuration, since it is possible to specify the reference position of the 3D model in figure units, the figures can be aligned to generate the finite difference model. Therefore, it is possible to output a visually comprehensible finite difference model.

(3) The machining simulator 1 further includes: a machining program specifying unit 20 that specifies a machining program corresponding to the finite difference model generated, among a plurality of machining programs included in each of the CNC programs, in which the display control unit 21 controls display of a specified machining program. With such a configuration, it is possible to easily confirm the machining program corresponding to the finite difference model.

(4) Furthermore, the 3D model generating unit 12 generates a 3D model for each version of a CNC program, and the superimposed model unit 15 superimposes 3D generating models generated for each version. With such a configuration, it is possible to easily recognize the difference of the machining results for each version of the differences.

(5) The machining simulator 1 further includes: a coordinate specifying unit 17 that specifies a vertex coordinate of a vertex in a corresponding relationship in respective superimposed 3D models; a deviation detecting unit 18 that detects a deviation between 3D models of specified vertex coordinates of vertices; and a size calculating unit 19 that calculates a size of a detected deviation, in which the display control unit 21 controls display of a size of a calculated deviation. With such a configuration, it is possible to easily grasp how much deviation occurs sensibly as a result of actual machining.

Although a preferred embodiment of the machining simulator and the storage medium encoded with the machining simulation program of the present disclosure has been described above, the present disclosure is not limited to the above-described embodiment and can be appropriately modified. For example, in the above embodiment, the CNC program is not limited to one stored in the industrial machine. The CNC program may be acquired through a network.

Furthermore, in the above embodiment, the number of superimposed 3D models is not limited to two. For example, the superimposed model generating unit 15 may superimpose three or more 3D models.

Furthermore, in the above embodiment, the machining simulator 1 has been described as being included in an industrial machine; however, the present disclosure is not limited thereto. For example, the machining simulator 1 may be provided separately from the industrial machine.

EXPLANATION OF REFERENCE NUMERALS 1 machining simulator
12 3D model generating unit
14 reference position specifying unit
15 superimposed model generating unit
16 finite difference model generating unit
17 coordinate specifying part
18 deviation detecting unit
19 size calculating unit
20 machining program specifying unit
21 display control unit

What is claimed is:
1. A machining simulator that virtually executes a Computerized Numerical Control (CNC) program to simulate a machining result, the machining simulator comprising:
a non-transitory memory configured to store at least one program; and
a hardware processor configured to execute the at least one program and control the machining simulator to:
virtually execute a plurality of CNC programs to generate 3D models from respective machining results obtained;
specify a predetermined coordinate of a vertex common to the 3D models generated as a reference position for each of the 3D models;
generate a superimposed model in which the reference positions of the 3D models are superimposed;
generate a finite difference model obtained by taking a finite difference of the 3D models included in the superimposed model generated; and
control display of at least one of the superimposed model generated and the finite difference model, wherein
the machining simulator generates the 3D models for each version of the plurality of CNC programs, and
superimposes the 3D models generated for each version.

2. The machining simulator according to claim 1, wherein the machining simulator specifies a plurality of coordinates common to the 3D models as the reference position.

3. The machining simulator according to claim 1, wherein the hardware processor is configured to execute the at least one program to further: specify a machining program corresponding to the finite difference model generated, from a plurality of machining programs included in each of the plurality of CNC programs,
  wherein the machining simulator controls display of a specified machining program.

4. The machining simulator according to claim 1, wherein the hardware processor is configured to execute the at least one program to further:
  specify a vertex coordinate of a vertex in a corresponding relationship in respective superimposed 3D models;
  detect a deviation between 3D models of specified vertex coordinates of vertices; and
  calculate a size of a detected deviation,
  wherein the machining simulator controls display of a size of a calculated deviation.

5. A non-transitory computer-readable storage medium encoded with a machining simulation program that causes a computer to function as a machining simulator that virtually executes a Computerized Numerical Control (CNC) program to simulate a machining result, the machining simulation program causing the computer to perform steps comprising:
  virtually executing a plurality of CNC programs to generate 3D models from respective machining results obtained;
  specifying a predetermined coordinate common to the 3D models generated as a reference position for each of the 3D models;
  generating a superimposed model in which the reference positions of the 3D models are superimposed at the reference position;
  generating a finite difference model obtained by taking a finite difference of the 3D models included in the superimposed model generated; and
  controlling display of at least one of the superimposed model generated and the finite difference model,
  wherein
  the machining simulator generates the 3D models for each version of the plurality of CNC programs, and
  superimposes the 3D models generated for each version.

* * * * *